Figure 1:
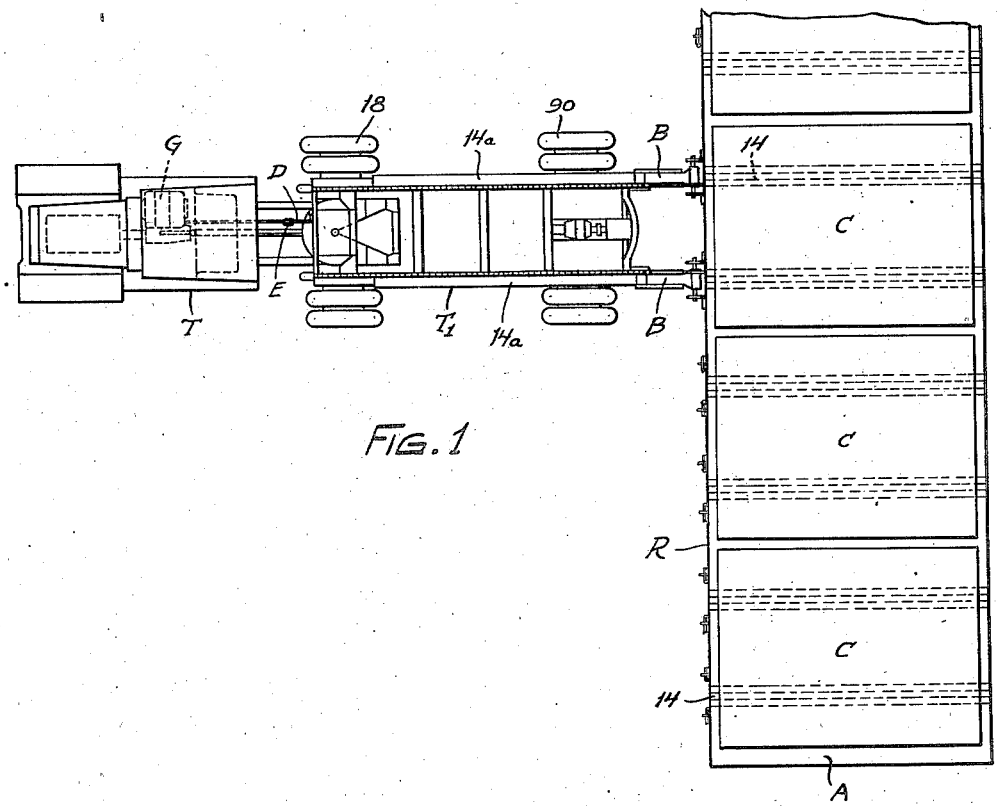

Aug. 16, 1938. B. F. FITCH 2,127,482
FREIGHT HANDLING VEHICLE
Filed Sept. 9, 1935 5 Sheets-Sheet 1

INVENTOR.
Benjamin F. Fitch,
BY
Davis, Golrick & Fear
ATTORNEYS.

Aug. 16, 1938.     B. F. FITCH     2,127,482
FREIGHT HANDLING VEHICLE
Filed Sept. 9, 1935     5 Sheets-Sheet 2

INVENTOR.
Benjamin F. Fitch,
BY
Bates, Golrick & Fean
ATTORNEYS.

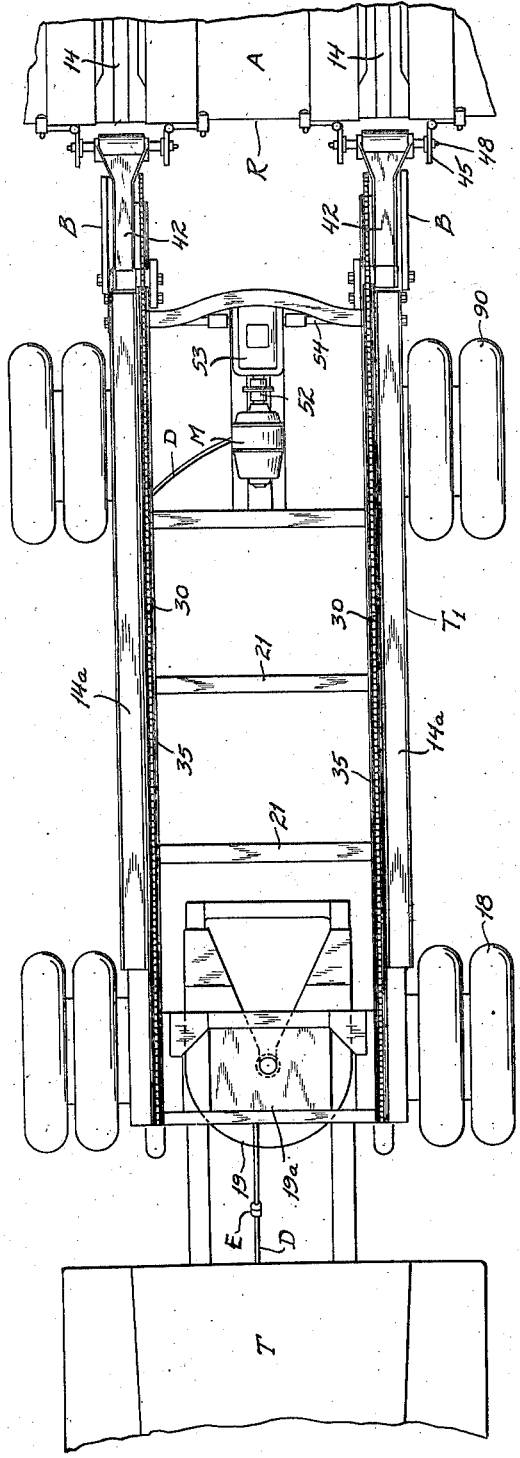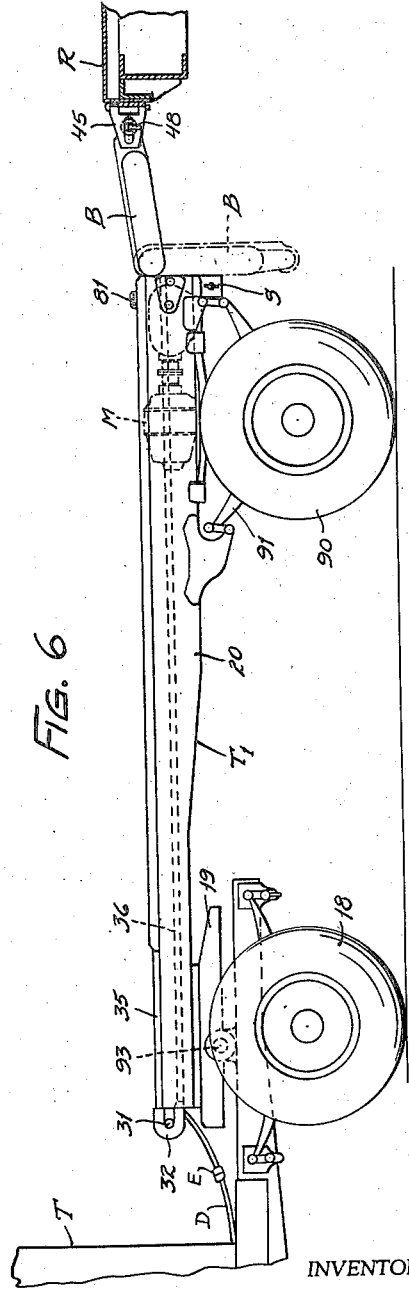

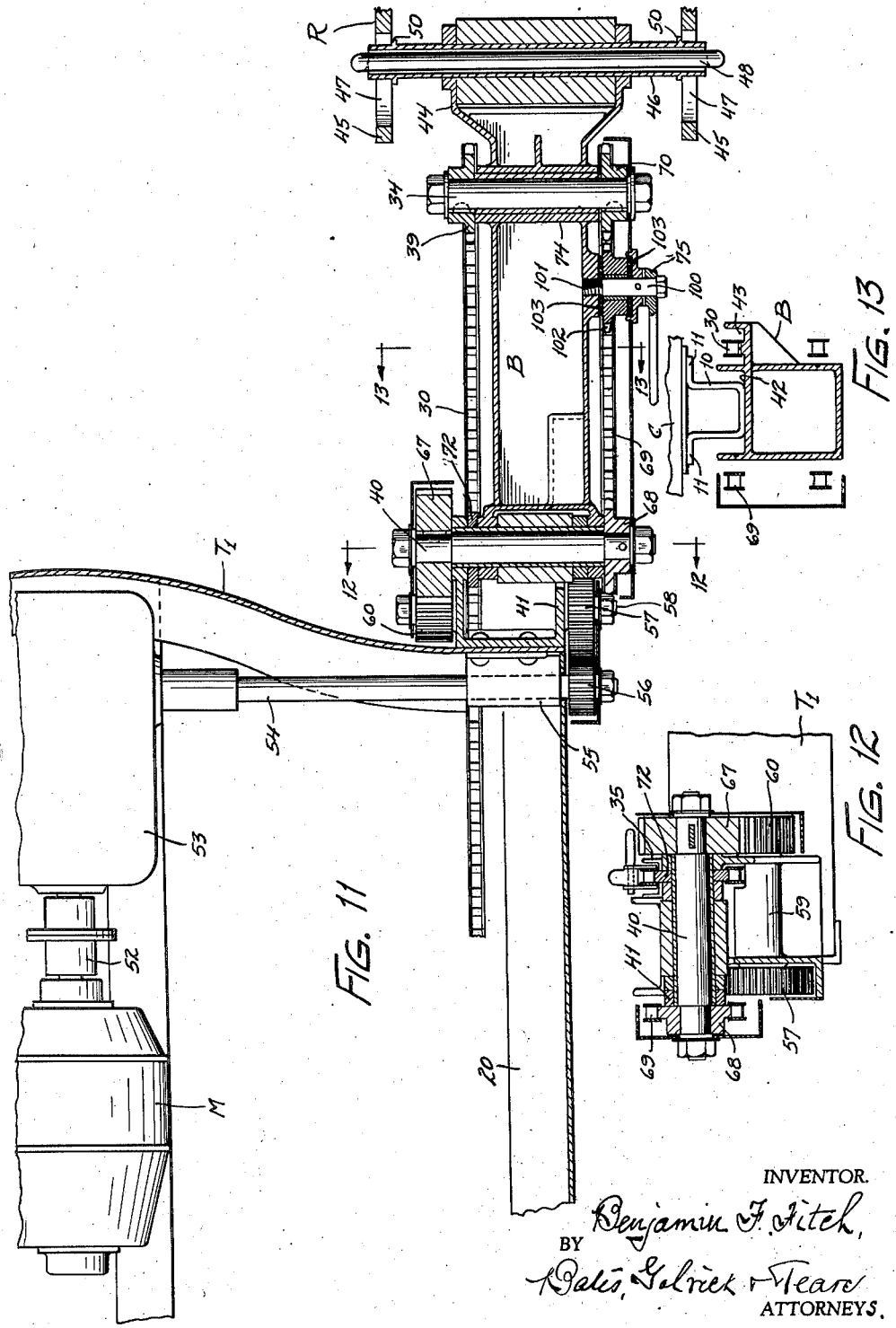

Patented Aug. 16, 1938

2,127,482

UNITED STATES PATENT OFFICE 2,127,482

FREIGHT HANDLING VEHICLE

Benjamin F. Fitch, Greenwich, Conn.

Application September 9, 1935, Serial No. 39,725

9 Claims. (Cl. 214—83)

This invention relates to a freight-handling vehicle, and especially to a vehicle having a power operated mechanism thereon to move a demountable freight container to and from the vehicle. The present invention comprises an improvement in the vehicle shown and claimed in my prior application, filed January 15th, 1935, and assigned Serial No. 1,926, and is well adapted for use in a system of handling freight, such as shown in my prior application for Letters Patent, filed December 3, 1934, and assigned Serial No. 755,752.

In my copending applications, above referred to, I have shown, described and claimed a system of handling freight, wherein the freight is stored in demountable freight containers or bodies, and slid substantially horizontally from a motor vehicle to a railway car, and transported thereby to a distant point and slid therefrom to a motor vehicle, while carries the container to a shipper's platform, to which they are slid to permit utilization of the truck for other loads during the unloading and loading operations. In such a system I prefer to provide the containers and carriers with coacting guide members to guide the container for a horizontal sliding movement from one surface to another, and I also prefer to utilize a mechanism operable by the power plant of one of the vehicles, for sliding the container either from such vehicles to another vehicle or to a platform, or vice versa.

In such a system I find it highly advantageous to employ a motor vehicle of the type which comprises a truck or tractor member, arranged to draw a two-wheeled trailer adapted to carry the body. Such a unit is more readily adaptable to the various highway rules and restrictions than one where the load-supporting surface is mounted on the same chassis as the power unit. I also find it advantageous to so arrange the mechanism utilized for sliding the container between the truck and the platform, that the entire mechanism will be carried by the truck unit, namely, the tractor and trailer, thereby eliminating the requirement for the installation of any permanent equipment at the various shippers' platforms or points of interchange of the containers, other than guiding members which may readily be removable therefrom.

In my prior applications above referred to, I have disclosed the use of a pair of looped chain members carried by the trailer and connected by suitable gearing to the power plant of the tractor. Such chain members are arranged to be connected by suitable connecting members, with a demountable body, and consequent upon movement of the chains, force the body to or from the trailer. I have found that the use of such gearing for drivingly connecting the body-propelling chains on the trailer with the motor of the tractor requires a somewhat intricate and expensive power transmission mechanism that will enable a trailer to be readily disconnected from the tractor. It is likewise difficult to so arrange the mechanical power transmission mechanism as to permit the swinging movement of the trailer when being transported by the tractor. The present invention is concerned with an improved form of driving mechanism, which will be an improvement on the mechanism shown in my prior applications. This, therefore, is one of the objects of the present invention.

I prefer to accomplish the above object by providing the trailer with an electric motor, suitably connected to the driving chains, and to provide the automotive vehicle with a generator arranged to be driven by the power plant of such vehicle and arranged to provide electric power to the motor carried by the trailer. This arrangement enables the use of a comparatively simple electric connector, which may be readily carried by a flexible cable, thereby permitting free movement of the trailer relative to the tractor and greatly simplifying the driving mechanism, as well as increasing the efficiency. This, therefore, is a more specific object of the present invention.

In my prior applications heretofore referred to, I have provided a trailer and car or platform with guide rails arranged to coact with guide members carried on the underside of a removable container, and I have provided the trailer with a suitable interconnecting device or bridge arranged to interconnect the guides of the trailer with the guides of the platform or railway car, so that in effect a continuous guideway is formed across which the container may be slid. It is an object of the present invention to provide an improved form of interconnecting guideway or bridge and to so arrange this interconnecting bridge that it may be pivoted to the truck, at its outermost end, support the chains which are utilized to transport the body from a loading surface to the truck, or vice versa. This, therefore, is a more specific object of the invention.

Other objects of the invention will become more apparent from the following description, reference being had to the accompanying drawings, in which I illustrate a preferred embodiment of the invention. The essential and novel features of the invention will be summarized in the claims.

Figure 2:
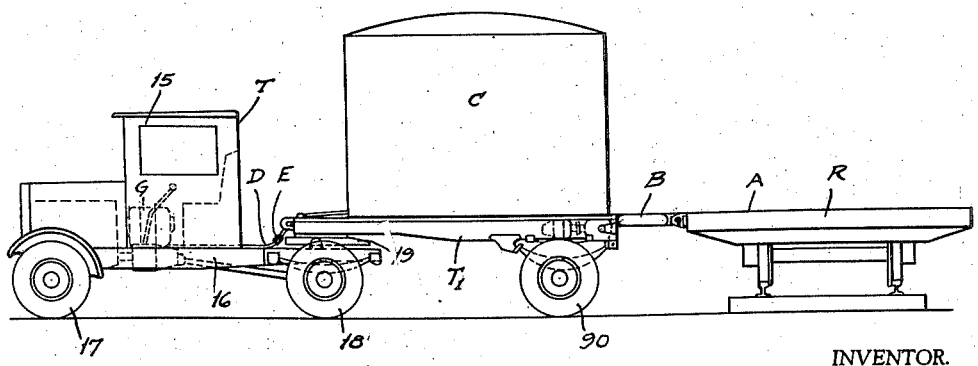
Figure 3:
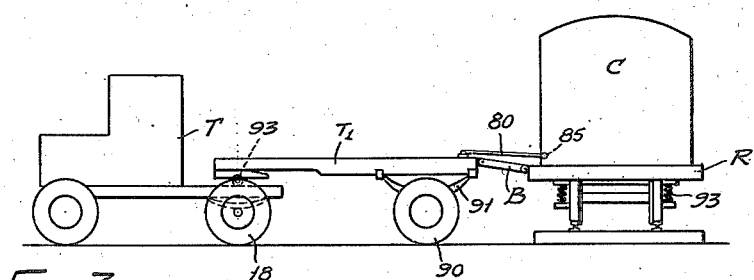
Figure 4:
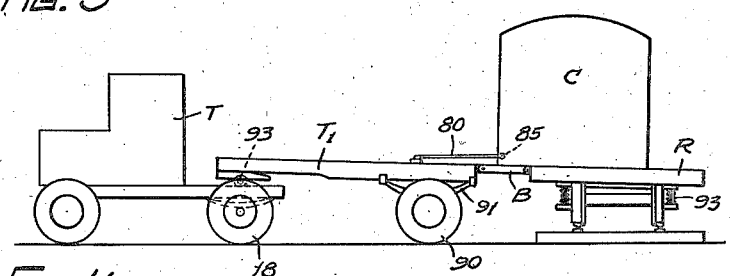
Figure 5:
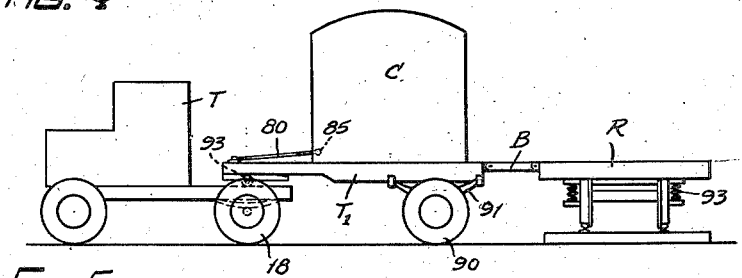
Figure 15:
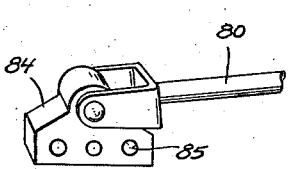
Figure 16:
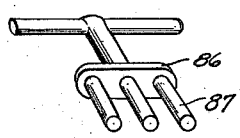
Figure 14:
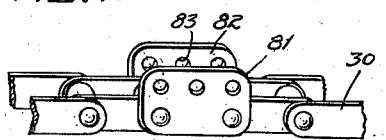
Figure 8:
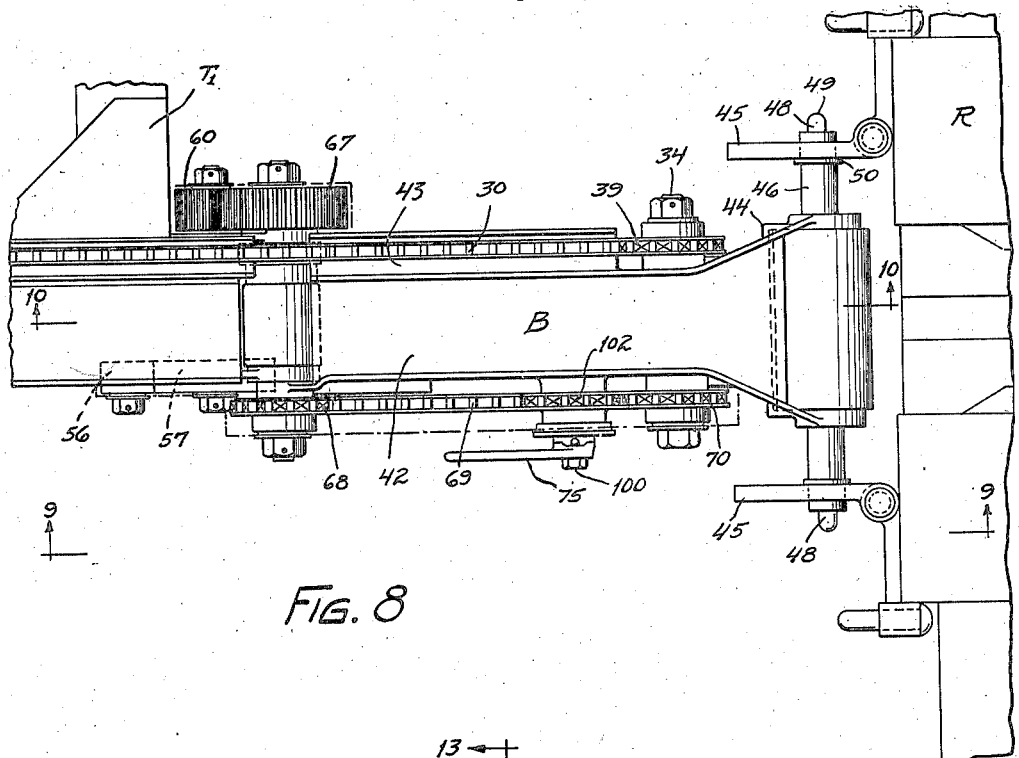
Figure 9:
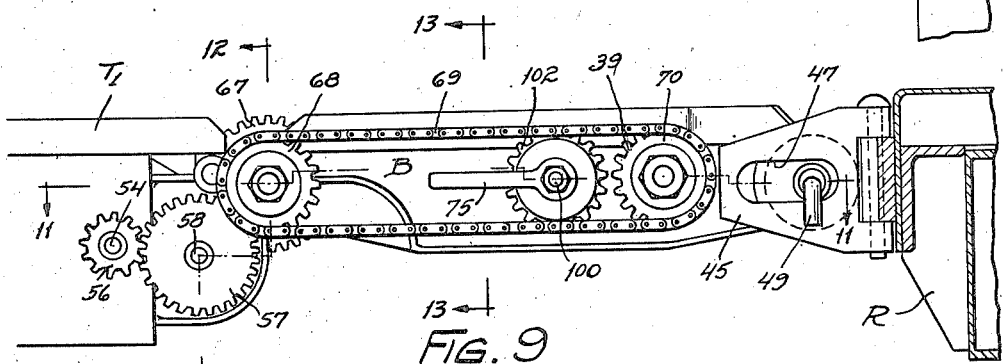
Figure 10:
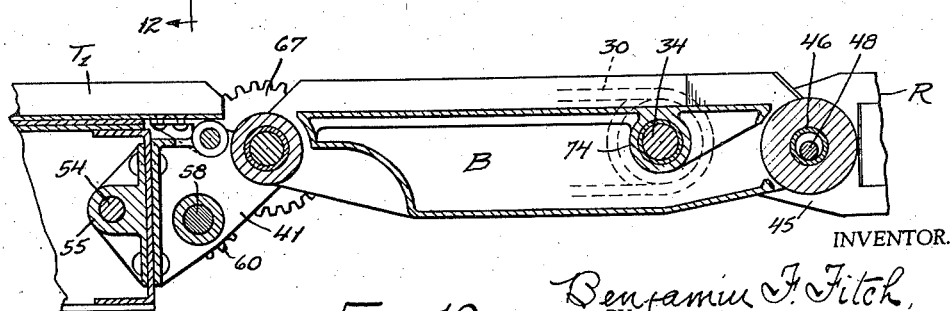

Referring now to the drawings, Fig. 1 is a plan view, illustrating an automotive vehicle in position adjacent a railway car or platform, ready to receive a container from the car; Fig. 2 is a side elevation of the car and vehicle shown in Fig. 1, illustrating the removable container positioned on the trailer of the vehicle; Figs. 3, 4 and 5 are diagrammatic illustrations, similar to Fig. 2, but illustrating the relative angular positions of load-supporting surfaces of the truck trailer, the car and interconnecting bridge member, at various positions of the body during its movement from the car to the trailer; Fig. 6 is an elevation on an enlarged scale of the trailer, including the adjacent portions of the tractor and railway car, together with the interconnecting ramp member; Fig. 7 is a side elevation of the trailer and adjacent parts, shown in Fig. 6; Fig. 8 is a fragmentary plan view of the interconnecting ramp member on a scale somewhat larger than that of Fig. 6; Figs. 9 and 10 the vertical sections, as indicated by the correspondingly numbered lines on Fig. 8; Fig. 11 is a horizontal section, the plane of the section being indicated by the lines 11—11 on Fig. 9; Figs. 12 and 13 are vertical sectional details, the plane of the sections being indicated by the lines 12—12 and 13—13, respectively, on Fig. 9; Fig. 14 is a fragmentary view of a section of the portion of the transferring chains of the trailer, illustrating the connector link; Fig. 15 is a fragmentary perspective of one end of the connecting device, which is connected to the link of the chain, the other end of which is connected in any suitable manner to the body or removable container; Fig. 16 is a lock member for locking the connecting device with the chain.

As heretofore mentioned, this invention is especially adapted for use in a system for transferring freight containers, by sliding or skidding the container horizontally between a trailer and a railway car or platform. As shown in Fig. 1, I have illustrated a platform A, which may comprise, either the usual shipper's platform, or, as shown, the platform of a railway car R.

As there shown, the automotive carrier comprises a truck or tractor T, which draws a detachable trailer T1. The truck unit has previously been positioned adjacent to the railway car, and the bridge or interconnecting ramp mechanism has been interconnected between the car and the trailer. The container, shown on the platform A of the car, is ready to be skidded from the platform onto the trailer by a power mechanism carried by the trailer and operatively connected to a generator G, by suitable flexible electric conduits or cables D, having the usual connector device E mounted therein to permit the trailer to be readily separated from the truck.

The container C may be the usual body member, having side and end walls supported by a suitable frame and provided with suitable doors, not shown. Rigidly secured to the bottom of the container and extending downwardly therefrom are a series of inverted rails 10. As shown in Fig. 13, the rails comprise a flat bottom sheet metal U, having flanges 11 which are secured by any suitable means to the lower face of the body frame. These rails are arranged to slide in suitable channels or guideways 14, Fig. 1, by the platform or railway car, and similar guideways 14a on the automotive carrier or trailer. The guides 14 and 14a serve to guide and maintain the body in proper position on the carriers.

I will first describe in detail the tractor and trailer, as illustrated in the drawings, and especially with reference to Figs. 1, 2, 6 and 7. As there shown, the tractor proper comprises the usual motor and cab unit 15 mounted on a chassis frame 16, and supported by suitable dirigible forward wheels 17 and rear driving wheels 18. The tractor chassis carries one member of a trailer connecting device 19, the other member of which, 19a, is detachable therefrom, and is carried in the usual manner by the trailer frame T1.

The trailer T1 comprises the usual longitudinal chassis frame members 20, which are connected together by suitable cross-frame members 21, and adjacent their forward ends carry the trailer connecting device 19a which connects the truck with the tractor.

The channels or guides 14a are as heretofore mentioned carried by the trailer. As shown in Figs. 6 and 7, the chassis frame members are spaced apart a distance equivalent to the spacing of the guide rails 10 of the body. The guide channels 14a, as shown, comprise a pair of inverted structural channels which are secured to respective trailer frame members 20 in any well known manner.

As heretofore mentioned, the containers C are slid from the platform or car to the trailer or vice versa by a power operated mechanism carried by the trailer. This mechanism includes a pair of chains 30. As indicated in Figs. 6 and 7, each of these chains form a continuous loop which, adjacent its forward end, passes around a suitable sprocket, (not shown) but carried by respective transverse shaft members 31, mounted in housings 32 adjacent the forward end of the trailer. At their rear ends the chains pass around respective sprockets 33, (Fig. 11) secured to shafts 34, which are journalled in bearings 37 carried in the outer ends of respective bridge members B. The chains are so positioned that their upper and lower stretches ride in suitable channels 35 and 36, respectively, such channels being carried by the trailer frame members 20, heretofore described. The arrangement is such that the upper stretch of each chain is disposed adjacent the inwardly facing flange of its respective guide channel 14a, and in substantially the same horizontal plane.

The interconnecting bridge or extension members B are pivoted to respective transverse shafts 40, which are journalled in bracket members 41, secured to the trailer frame adjacent the end of the frame members 20 and guide channels 14a. Each bridge or extension member B comprises a box-shaped casting or beam member, with upstanding flanges on its top wall. The flanges form a pair of upwardly facing channels 42 and 43. When the bridge is in the position shown in Figs. 6 and 7, the channels 42 align with the guideways 14 and 14a of the platform and truck, respectively, whereas the channel 43 aligns with its respective chain guide channel 35.

Each bridge beam or casting is provided, at its outer end, with a U-shaped bracket formation 44, in which is mounted a horizontal tube 46, which is adapted to occupy supporting members carried by the car as about to be explained.

The bridge-supporting members are described and claimed in my copending application, Serial No. 32,131 filed July 18th, 1935, and reference may be had to such application for a more complete description thereof. Briefly, the supporting members carried by the car each comprise a pair of hinged bracket members 45, the wings of which may fall parallel with the sides of the car, but which, when in use, extend at right angles from the car, as shown in Fig. 8. The wings have suitable openings 47 therein, the end portions of the tube 46 of each bridge are adapted to extend in the openings of their respective pair of brackets, so that the brackets support that end of the bridge.

Lying loosely in the tube 46 is a rod 48, having normally depending ends 49. When the bridge is to be connected to the brackets of the car, it is lifted until the tube 46 is substantially at the same height as the opening 47, and then the wings of the supporting member 45 are swung over the ends of the tube. During such movement the ends 49 of the rods are temporarily lifted into a horizontal position, and thus pass readily through the openings 47, which are in the form of horizontal slots. When the tube is in the slots, as indicated in Fig. 9, the release of the rod 49 allows the end thereof to drop by gravity, overhanging the face of the wing 45, thus preventing separation of the parts. The tube 46 may, if desired, be provided with suitable shoulders 50, to limit the inward movement of the wing-supporting members 45 toward each other. In this position, therefore, the bridge is effectively secured to the side of the car, though the slots allow limited movement of the bridge to and from the car, as well as permitting slight angular variations between the truck and the sides of the car.

After the bridges have been manually raised and before they have been connected to their supports 45, they may be locked in place to permit the backing of the truck into position by merely turning a handle 75, as will be hereinafter more fully described.

As heretofore mentioned, the interconnecting bridge members are arranged to be swung downwardly about their pivots to decrease the overall length of the trailer during the transportation over the highway. To this end the body propelling chains 30 are supported by suitable pulleys 72, carried by the pivot shaft 40, thereby preventing undue sagging of the chain during the travel of the truck. The chain guiding channels 35 and 36 also serve to aid this purpose.

The driving mechanism for the body-propelling chains comprises an electric motor carried by the trailer and drivingly connected to the forward driving sprocket 39, which supports the chain 30. As shown in the drawings, and especially Figs. 8 to 12, inclusive, I mount an electric motor M between the trailer frame members 20, and drivingly connect this motor by a suitable coupling 52, to a gear reduction unit 53, which, in turn, is provided with suitable transverse driving shafts 54, extending to either side thereof, and journaled at their outer ends in suitable bearings 55, carried by the frame member 20.

As shown in Figs. 6 and 11, each drive shaft 54 has secured adjacent its outer end a pinion 56, arranged to mesh with a gear 57, drivingly secured to a counter-shaft 58, which is journalled in a suitable bearing member 59, forming part of the frame bracket member 41 heretofore described. The shaft 58 carries adjacent its inner end a pinion 69, arranged to mesh with a gear 67 mounted on the inner end of the pivot shaft 40, which forms the pivotal connection between the truck and the bridge member B. Rigidly secured to the outer end of each pivot shaft 40 is a sprocket 68, which is connected by a suitable drive chain 69 with a sprocket 70, drivingly secured to the shaft 34, which in turn carries the respective body propelling chain 30, heretofore described. Hence, when the motor is operated, the body propelling chains 30 will be moved to propel the body either to or from the trailer, depending upon the direction of rotation of the motor; the motor being controlled by a suitable reversing switch member, such as indicated at S on Fig. 7.

The bridge members B are locked in a raised position to permit the backing of the truck into position by the turning of the handle 75, which acts to prevent movement of the driving chain 69 relative to the bridge member. The reduction gearing 53 is such that, in order to rotate the drive sprocket 68, the motor must be operated. Hence, when relative movement between the drive chain and bridge is prevented and the motor remains inactive, the swinging movement of the bridge about its pivot shaft 40 is prevented.

The locking of the drive chain relative to the bridge is accomplished by turning the handle 75 (Figs. 9 and 11). This handle is secured to a shaft or stud 100, which threadingly engages the bridge B, between the pivot shaft 40 and the sprocket shaft 34, as at 101. Rotatably mounted on the stud 100 between the handle 75 and the bridge is a sprocket 102, which ordinarily acts as an idler, engaging both the upper and lower stretches of the drive chain 39, as shown in Fig. 9. When the bridge is to be locked the handle is rotated to clamp the sprocket 102 to the bridge. Suitable friction discs, such as shown at 103, may be disposed between the sprocket and the handle 75, as well as between the sprocket and the bridge to increase the friction therebetween and prevent inadvertent movement of the sprocket and therefore the bridge due to sudden shocks.

The containers may be connected to the chains 30 by any suitable means, as, for instance, by the connectors 80, illustrated in Figs. 1, 2, 14, 15 and 16. As there shown, each chain 30 is provided with a connector link 81. These links, as shown in Fig. 14, comprise a pair of spaced plates 82, which extend upwardly above the remaining links of the chain and are provided with aligned openings 83.

Pivotally mounted at one end of the connector 80 is a block 84 arranged to seat between the plates of the connector link 81. The block 84 is provided with openings 85, which, when the block is in position between the plates of the connector link, align with the openings 83 in such plates, whereupon a locking member 86 (Fig. 16) carrying pins 87 may be inserted in the aligned openings, thereby securing the connector to the drive chain. The other end of the connector 80 is preferably secured to the container by a ball and socket arrangement 85, which is fully shown and described in my Patent No. 2,108,813, and hence no detailed description is given herein. The connector member is, however, preferably a rigid bar to the end that it may act as a compression member to shove the container from the trailer, or to act as tension members to draw the container onto the car.

It will be noted from inspection of Figs. 3, 4 and 5 that the rear of the tractor is supported by the wheels 18 through the usual leaf spring assembly, and a pair of rear wheels 90 support the rear of the trailer through similar leaf springs 91. It will likewise be noted that the railway car R is provided with the usual car springs 93. I find, under ordinary conditions, that when a loaded container is resting upon the car, the parts assume positions similar to those illustrated in Fig. 3. In this figure it will be noted that the load supporting surfaces of trailer frame, and car, are each substantially horizontal, the former being at a somewhat higher elevation than the latter. The interconnecting bridge member B slopes from the trailer downwardly towards the car. The trailer is now in position to receive the load, due to the construction of the interconnecting bridge supports, namely, the car brackets 45 and the pivot 40.

I find that the truck and trailer brakes may be released and the reactions caused by the moving of the containers may be entirely transmitted to the car through the bridge members, thereby preventing scuffing of the truck and trailer tires and permitting the truck springs to react to the loads imposed thereon by the weight of the container without interference or abnormal loadings, due to the reaction of the power skidding mechanism. This is also highly advantageous in another way, namely, less power is required to move the container, and there is less strain on the various frame members and the container during its sliding movements.

As the container C is slid from the car to the trailer, the left-hand edge of the container (Fig. 3) strikes the inclined bridge B. The weight of the container then has a tendency to concentrate at the ends thereof, thereby increasing the load on the right-hand car springs and decreasing the load on the left-hand car springs, simultaneously the application of the load to the bridge member B reacts on the trailer springs 91. The load supporting surfaces thereupon assume substantially the positions shown in Fig. 4. In this figure it is to be noted that the load supporting surfaces of the trailer, ramp and car are substantially in alignment with each other. The rocking of the trailer relative to the truck is permitted due horizontal trunnion support 93 for the tractor-trailer interconnecting device.

As the container approaches the position shown in Fig. 5, the load on the car is decreased and the loading on the trailer is increased, the sloping of the various surfaces gradually assuming a horizontal position until, when the load is at rest on the trailer, the truck and tractor springs deflect to lower the trailer surface, whereas the car springs expand to raise the car surface into substantial horizontal alignment with the trailer surface.

When the container is moved from the trailer to the car, the relative movements of the load supporting surfaces is reversed. This arrangement of supporting springs, pivots and interconnecting bridge members, however, causes each of the load supporting surfaces to substantially align with the other load supporting surfaces, thereby preventing undue concentration of the loads and greatly decreasing the power required to move the container.

I claim:

1. The combination of a highway vehicle comprising a tractor having a power unit for propelling the vehicle, a trailer detachably and pivotally connected to the tractor and having a guideway for a demountable body, an electric motor carried by the trailer, a source of electrical energy mounted on the tractor, an electric power connection between the tractor and the trailer, a bridge member connected to the trailer and forming a continuation of the guideway of the trailer, a flexible member looped at one end about means carried by the trailer and at the other end about means carried by the bridge member, a power transmission mechanism connecting the motor with said flexible member, and means whereby the movement of the flexible member may slide a body along said guideway onto or off of the trailer, dependent upon the direction of movement of said flexible member.

2. The combination of a highway vehicle comprising a tractor having a power unit for propelling the vehicle, a trailer connected to the tractor and having a guide-way, a demountable body having supporting members adapted to coact with said guideway, an electric motor carried by the trailer adjacent the rear end thereof, a source of electrical energy mounted on the tractor, a flexible electric power connection between the tractor and the trailer, a bridge member pivotally connected to the trailer and forming an extension of the guideway of the trailer, a flexible member looped about means carried by the truck and about means carried by the bridge member, a power transmission mechanism connecting the motor with said flexible member, said transmission mechanism including a member coaxial with the pivotal connection between the bridge member and the trailer and connected to the motor and to means carried by the bridge member to propel said flexible member, and means to connect said flexible member with said demountable body.

3. The combination of a highway vehicle having a guide thereon, a bridge member pivotally connected to the vehicle and adapted to be connected to a platform, said bridge having a guide forming a continuation of the guide of the vehicle, a chain looped at one end about means carried by the vehicle and at the other end about a sprocket carried by the bridge member, power mechanism carried by the vehicle, a power transmission device drivingly connecting said power mechanism and said sprocket, said transmission including a member supported coaxially with the pivotal connection between the bridge member and the vehicle, a driving connection between said power mechanism and said coaxial member, and a driving connection between said coaxial member and said sprocket.

4. The combination of a highway vehicle having parallel guides thereon, a pair of bridge members, each having a guide thereon and pivotally connected to the vehicle and adapted to be connected to a platform, the guides of the bridge members forming a continuation of the guides of the vehicle, a chain looped at one end about means carried by the vehicle and at the other end about a sprocket carried by the bridge member, power mechanism carried by the vehicle, a power transmission device interconnecting said power mechanism and said sprocket, said transmission including a member supported coaxially relative to the pivotal connection between the bridge member and the vehicle, a driving connection between said power mechanism and said coaxial member, an independent driving connection between said coaxial member and said sprocket, a demountable body having a pair of supporting members adapted to coact with said guides, and means to connect said chain with said body, whereby said power mechanism may slide the body on or off the vehicle dependent upon the direction of progress of said chain.

5. The combination of a highway vehicle, a bridge member pivotally connected thereto and adapted to be connected to a platform, a chain looped at one end about means carried by the vehicle and at the other end about a sprocket carried by the bridge member, power mechanism carried by the vehicle, a power transmission device interconnecting said power mechanism and said sprocket, said transmission including a shaft supported coaxially relative to the pivotal connection between the bridge member and the vehicle, a gear drivingly supported by said shaft, a driving connection between said power mechanism and said gear, a sprocket drivingly connected to said shaft, a second shaft carried by said bridge member adjacent its outer end and drivingly supporting said first-named sprocket, a second sprocket carried by said last-named shaft, a drive chain looped around the last-named sprocket and the sprocket on the first-named shaft, and disposed at the side of the bridge member opposite the first-named chain.

6. The combination of a highway vehicle having a guide thereon, a shaft carried by said vehicle adjacent its rear end, an extension pivotally supported by said shaft and forming an extension of said guide, a shaft rotatably supported adjacent the outer end of said bridge, a chain looped around said last-named shaft and means carried by the vehicle and arranged to move freight along the guideways, sprockets carried by respective shafts, a chain interconnecting said sprockets, a gear carried by the first-named shaft, a motor carried by said vehicle, and power transmission means interconnecting said motor with said gear whereby said first-named chain may be progressed, regardless of the angular relationship between the extension and the vehicle.

7. The combination of a highway vehicle, an extension therefor pivotally caried by said vehicle, a chain looped about means carried by said extension and means carried by said vehicle, power mechanism drivingly connected to said chain to draw freight onto or off of said vehicle, and means independent of said chain to secure the extension against movement about its pivot, said means including a clamp carried by said extension adjacent its outer end.

8. The combination of a highway vehicle, an extension therefor pivotally carried by said vehicle, a shaft rotatably mounted on the outer end of said extension, means looped about said shaft and means carried by said vehicle whereby freight may be drawn onto and off of said vehicle, a sprocket drivingly mounted on said shaft, a second sprocket mounted coaxial with the pivotal connection between said extension and the vehicle, a drive chain interconnecting said sprockets, driving means for the last-named sprocket, and a clamping mechanism carried by said extension to restrain the drive chain against movement relative to said extension, driving mechanism for driving said second-named sprocket including a gear reduction unit, whereby the extension is secured against movement about its pivot when the driving mechanism is not in operation and the clamping mechanism is active.

9. The combination of a highway vehicle, an electric motor carried thereby, a bridge member pivotally connected to the rear end of the vehicle and forming a continuation of the guideway on the vehicle, a flexible member looped at one end about means carried by the vehicle, and at the other end about a rotary driving device carried by the bridge member, a power transmission mechanism connecting the motor with said rotary driving device, means whereby the movement of the flexible member may move a body along said guideway onto or off of the vehicle dependent upon the direction of movement of said flexible member.

BENJAMIN F. FITCH.